United States Patent
Liu et al.

(10) Patent No.: US 10,593,059 B1
(45) Date of Patent: Mar. 17, 2020

(54) OBJECT LOCATION ESTIMATING METHOD WITH TIMESTAMP ALIGNMENT FUNCTION AND RELATED OBJECT LOCATION ESTIMATING DEVICE

(71) Applicant: VIVOTEK INC., New Taipei (TW)

(72) Inventors: Cheng-Chieh Liu, New Taipei (TW); Fu-Min Wang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/188,314

(22) Filed: Nov. 13, 2018

(51) Int. Cl.
　　*G06T 7/70* (2017.01)
　　*H04N 5/247* (2006.01)
　　*H04N 5/04* (2006.01)

(52) U.S. Cl.
　　CPC .............. *G06T 7/70* (2017.01); *H04N 5/04* (2013.01); *H04N 5/247* (2013.01); *G06T 2207/20221* (2013.01); *G06T 2207/30232* (2013.01)

(58) Field of Classification Search
　　CPC ................................ H04N 5/04; H04N 5/247
　　See application file for complete search history.

(56) References Cited

U.S. PATENT DOCUMENTS

| | | | | |
|---|---|---|---|---|
| 7,450,735 | B1* | 11/2008 | Shah | G06T 7/292 |
| | | | | 348/143 |
| 9,607,243 | B1* | 3/2017 | Brualla | G06T 5/10 |
| 10,250,868 | B1* | 4/2019 | Arnold | G11B 27/19 |
| 10,423,164 | B2* | 9/2019 | Baran | G01C 11/04 |
| 2008/0219509 | A1 | 9/2008 | White | A63B 24/0003 |
| | | | | 382/107 |
| 2018/0308253 | A1* | 10/2018 | Ryu | G06K 9/00744 |

FOREIGN PATENT DOCUMENTS

| | | | | |
|---|---|---|---|---|
| CN | 104063867 A | * | 9/2014 | |
| CN | 107613159 A | * | 1/2018 | |
| CN | 108734739 A | * | 11/2018 | G06T 7/80 |

* cited by examiner

*Primary Examiner* — Tsion B Owens
*Assistant Examiner* — Shanika M Brumfield
(74) *Attorney, Agent, or Firm* — Winston Hsu

(57) ABSTRACT

An object location estimating method with a timestamp alignment function is applied to an object location estimating device. The object location estimating method includes acquiring a plurality of first frames from a first camera, setting a first predetermined point of time, defining a first previous frame and a first next frame closest to the first predetermined point of time from the plurality of first frames, acquiring a first previous coordinate value of an object within the first previous frame and a first next coordinate value of the object within the first next frame, and utilizing the first previous coordinate value and the first next coordinate value to compute a first estimation coordinate value of the object at the first predetermined point of time.

16 Claims, 6 Drawing Sheets

OBJECT LOCATION ESTIMATING METHOD WITH TIMESTAMP ALIGNMENT FUNCTION AND RELATED OBJECT LOCATION ESTIMATING DEVICE

BACKGROUND OF THE INVENTION

1. Field of the Invention

The present invention relates to an object location estimating method and an object location estimating device, and more particularly, to an object location estimating method with a timestamp alignment function and a related object location estimating device.

2. Description of the Prior Art

With the advanced technology, the multi-camera monitoring system is widespread used in a wide-range monitoring area to record all events possibly happen. A field of view of the single camera cannot cover the spacious monitoring area, so the conventional multi-camera monitoring system turns the plural cameras respectively toward different regions inside the monitoring area, and monitoring frames captured by the plural cameras are used to determine a trace of an object moved inside the monitoring area. For acquiring the accurate moving trace of the object, the plural cameras of the conventional multi-camera monitoring system are synchronized to ensure all the plural cameras can capture the monitoring frames at the same time. However, a capturing speed and a capturing frequency of each camera may be affected by hardware equipment and network connection quality, so that timestamps of the object's metadata generated by different cameras are asynchronous. Accuracy of an object tracing function is decreased when a difference between the timestamps is enlarged. Thus, design of an object tracing method capable of accurately aligning the object's metadata from the plural cameras is an important issue in the monitoring industry.

SUMMARY OF THE INVENTION

The present invention provides an object location estimating method with a timestamp alignment function and a related object location estimating device for solving above drawbacks.

According to the claimed invention, an object location estimating method with a timestamp alignment function includes acquiring a plurality of first frames captured by a first camera, setting a first predetermined point of time, defining a first previous frame and a first next frame closest to the first predetermined point of time from the plurality of first frames, acquiring a first previous coordinate value of an object within the first previous frame and a first next coordinate value of the object within the first next frame, and utilizing the first previous coordinate value and the first next coordinate value to compute a first estimation coordinate value of the object at the first predetermined point of time.

According to the claimed invention, an object location estimating device with a timestamp alignment function includes a receiver and a processor. The receiver is adapted to acquire frames captured by at least one camera. The processor is electrically connected to the receiver and adapted to acquire a plurality of first frames captured by a first camera, to set a first predetermined point of time, to define a first previous frame and a first next frame closest to the first predetermined point of time from the plurality of first frames, to acquire a first previous coordinate value of an object within the first previous frame and a first next coordinate value of the object within the first next frame, and to utilize the first previous coordinate value and the first next coordinate value to compute a first estimation coordinate value of the object at the first predetermined point of time.

In the present invention, fields of view the plural cameras can be partly overlapped or adjacent to each other, and the plural cameras can be synchronized before execution of the object location estimation. The object location estimating method and the object location estimating device of the present invention can set several predetermined points of time according to the specific frequency, acquire the object's metadata within the previous frame and the next frame around the predetermined point of time from each camera, and compute the metadata of the object at the predetermined point of time by the interpolation or any other mathematical functions, for generating the object's metadata when the timestamps of the plural cameras are the same. The present invention can calibrate a difference of the object's timestamp between the plural cameras for effectively increasing the tracing accuracy of the object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
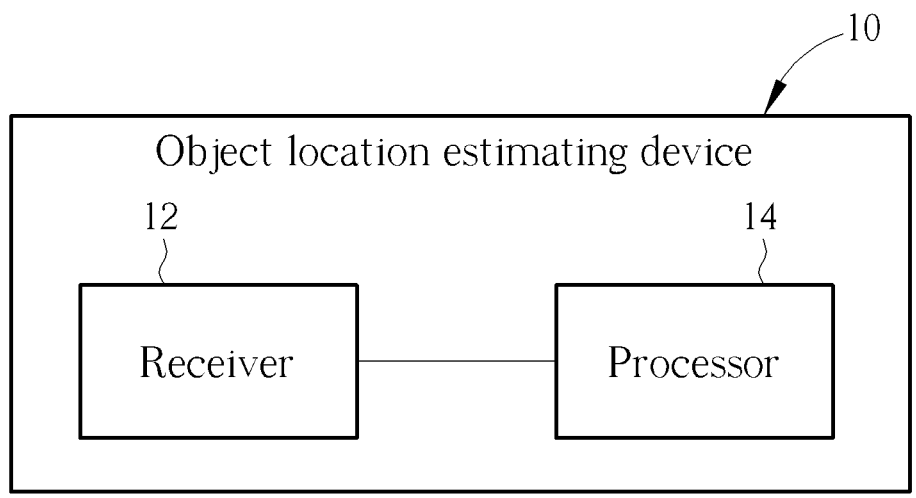
FIG. 1 is a functional block diagram of an object location estimating device according to an embodiment of the present invention.

Please refer to FIG. 1. FIG. 1 is a functional block diagram of an object location estimating device 10 according to an embodiment of the present invention. A plurality of cameras can be used to respectively capture monitoring frames about a monitoring region in different angles of view; although operation systems of the said cameras are synchronized, the monitoring frame captured by one camera may be earlier or later than the monitoring frame captured by another camera when the plural cameras are triggered at the same time. The object location estimating device 10 has a timestamp alignment function, which is used to align object data (some kind of metadata) within the monitoring frames captured by the plurality of cameras for increasing an object tracing accuracy. The object location estimating device 10 can be a server which collects frame data from the plural cameras to execute the timestamp alignment function. The object location estimating device 10 further can be a computable camera able to capture the own monitoring frame and receive the external monitoring frame captured by other cameras, and then execute the timestamp alignment function for calibrating the own monitoring frame and the external monitoring frame.

Figure 2:
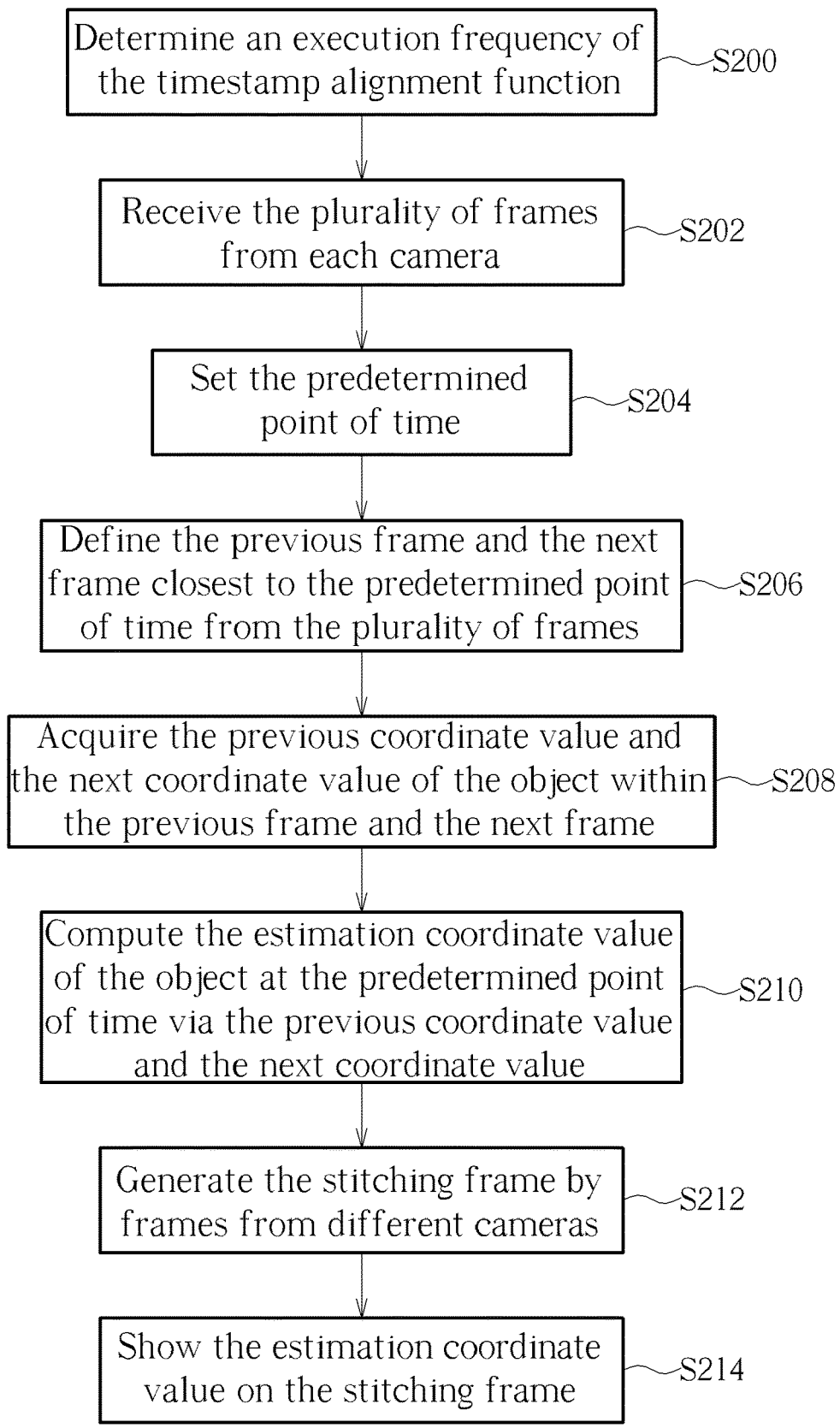
FIG. 2 is a flowchart of an object location estimating method according to the embodiment of the present invention.
Figure 3:
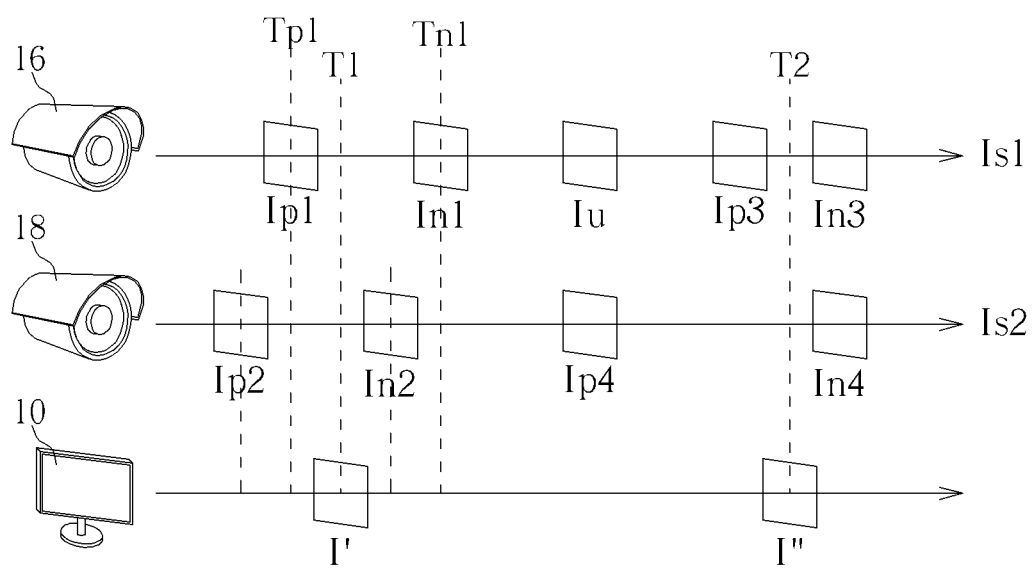
FIG. 3 is a diagram of the frames captured by the cameras in different points of time according to the embodiment of the present invention.
Figure 4:
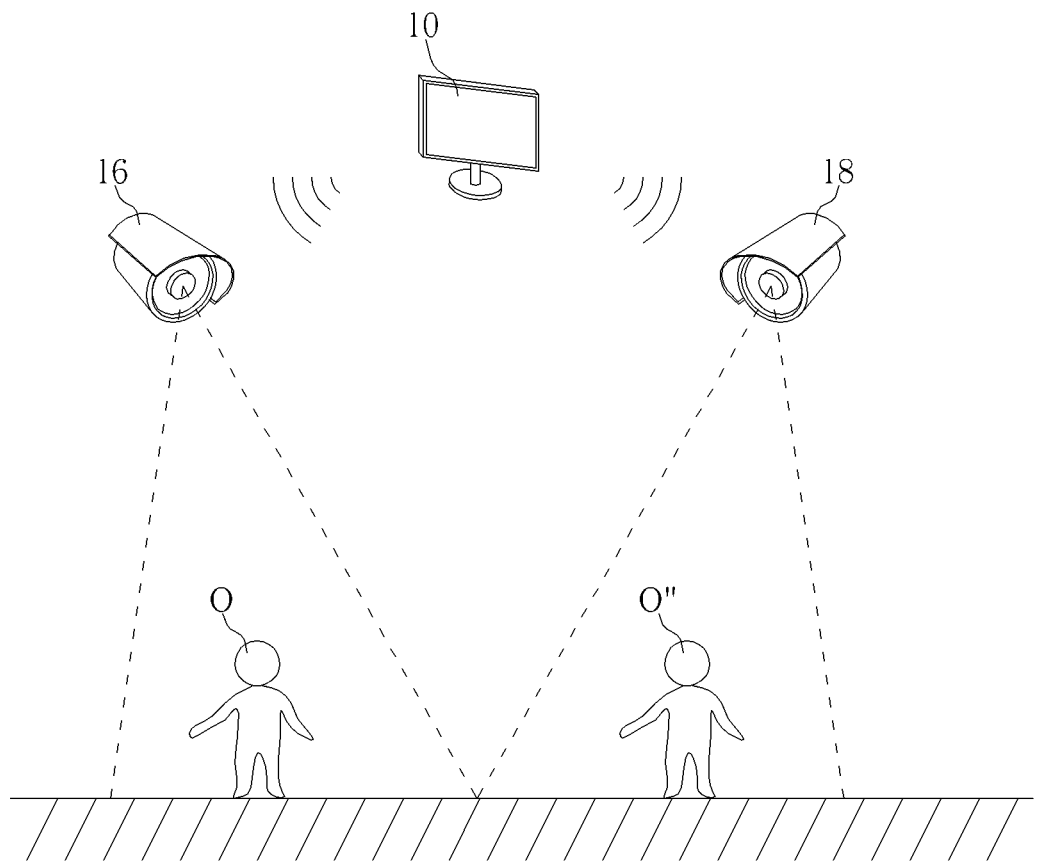
FIG. 4 is a diagram of the object location estimating device and the cameras according to the embodiment of the present invention.

Please refer to FIG. 1 to FIG. 4. FIG. 2 is a flow chart of an object location estimating method according to the embodiment of the present invention. FIG. 3 is a diagram of the frames captured by the cameras in different points of time according to the embodiment of the present invention. FIG. 4 is a diagram of the object location estimating device 10 and the cameras according to the embodiment of the present invention. The object location estimating device 10 can include a receiver 12 and a processor 14 electrically connected to each other. The receiver 12 can receive the frames captured by cameras 16 and 18. The object location estimating method executed by the processor 14 is suitable for the object location estimating device 10 shown in FIG. 1. The first camera 16 is synchronized with the second camera 18; however, a frame rate of the first camera 16 and a frame rate of the second camera 18 may be different from each other due to variability of system efficiency and network quality in the cameras 16 and 18, as shown in FIG. 3.

First, step S200 is executed that the processor 14 can determine an execution frequency of the timestamp alignment function. For instance, when the frame rates of the first camera 16 and the second camera 18 are 60 frames per second (FPS), the object location estimating method can set the execution frequency of the timestamp alignment function as 60 FPS or 30 FPS or any other proportioned values. Then, step S202 and step S204 are executed that the processor 14 can utilize the receiver 12 to receive a plurality of first frames Is1 captured by the first camera 16 and a plurality of second frames Is2 captured by the second camera 18, and set a first predetermined point of time T1 in accordance with the execution frequency of the timestamp alignment function. Step S206 is executed to define a first previous frame Ip1 and a first next frame In1 closest to the first predetermined point of time T1 from the plurality of first frames Is1, and define a second previous frame Ip2 and a second next frame In2 closest to the first predetermined point of time T1 from the plurality of second frames Is2.

Step S208 is executed to analyze the object O and the object O' inside the first previous frame Ip1, the second previous frame Ip2, the first next frame In1 and the second next frame In2, so as to acquire a first previous coordinate value Cp1 of the object O within the first previous frame Ip1, a first next coordinate value Cn1 of the object O within the first next frame In1, a second previous coordinate value Cp2 of the object O' within the second previous frame Ip2, and a second next coordinate value Cn2 of the object O' within the second next frame In2. Then, step S210 is executed to compute a first estimation coordinate value Ce1 of the object O at the first predetermined point of time T1 via the first previous coordinate value Cp1 and the first next coordinate value Cn1, and further compute a second estimation coordinate value Ce2 of the object O' at the first predetermined point of time T1 via the second previous coordinate value Cp2 and the second next coordinate value Cn2.

When the first estimation coordinate value Ce1 and the second estimation coordinate value Ce2 are acquired, step S212 and step S214 are executed to generate a stitching frame I' by one of the plurality of first frames Is1 and one of the plurality of second frames Is2, and show the first estimation coordinate value Ce1 of the object O and the second estimation coordinate value Ce2 of the object O' on the stitching frame I'. Therefore, the object location estimating device 10 can display moving traces about the object O and the object O' respectively captured by the first camera 16 and the second camera 18 on the stitching frame I'. The stitching frame I' with the said moving traces can be observed by the user easily or applied to other computation. In the present invention, the stitching frame is preferably generated by the first previous frame Ip1 and the second next frame In2, however actual application of generating the stitching frame is not limited to the above-mentioned embodiment.

It should be mentioned that the first estimation coordinate value Ce1 can be represented as a predicted coordinate of the object O at the first predetermined point of time T1, and the second estimation coordinate value Ce2 can be represented as a predicted coordinate of the object O' at the first predetermined point of time T1, therefore the first estimation coordinate value Ce1 and the second estimation coordinate value Ce2 can be defined as setting at the same point of time. Even if a difference between the first estimation coordinate value Ce1 and the second estimation coordinate value Ce2 may exist, the object location estimating method of the present invention can reduce the time difference to a minimal value so that the first estimation coordinate value Ce1 is defined as being identical with the second estimation coordinate value Ce2.

Figure 5:
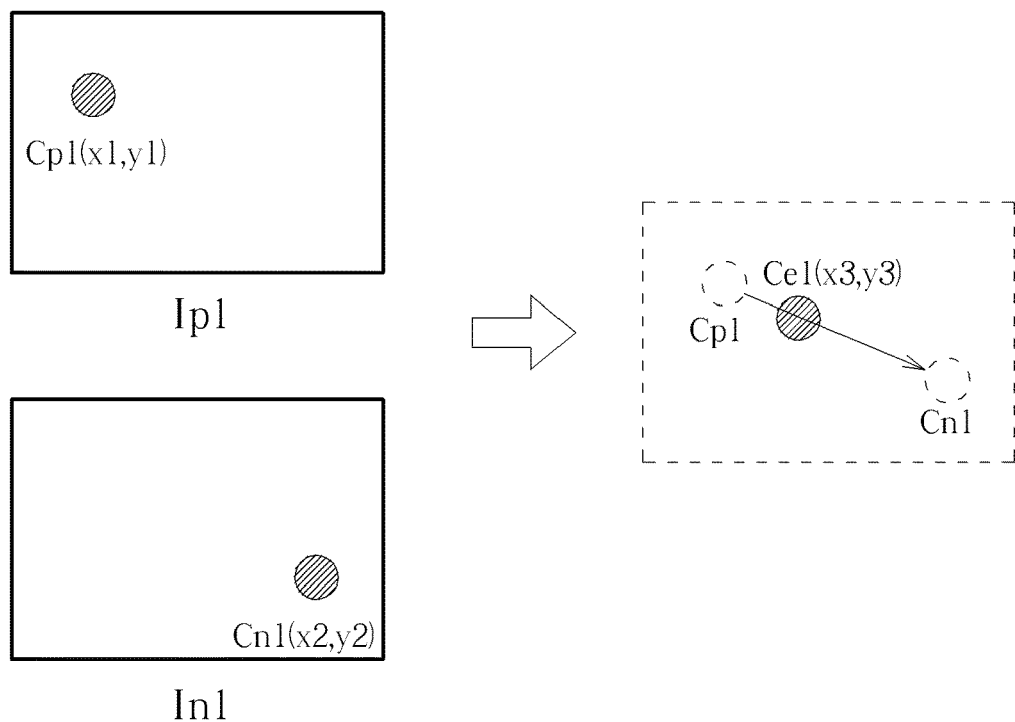
FIG. 5 and FIG. 6 are diagrams of transforming the previous coordinate value and the next coordinate value into the estimation coordinate value according to the embodiment of the present invention.
Figure 6:
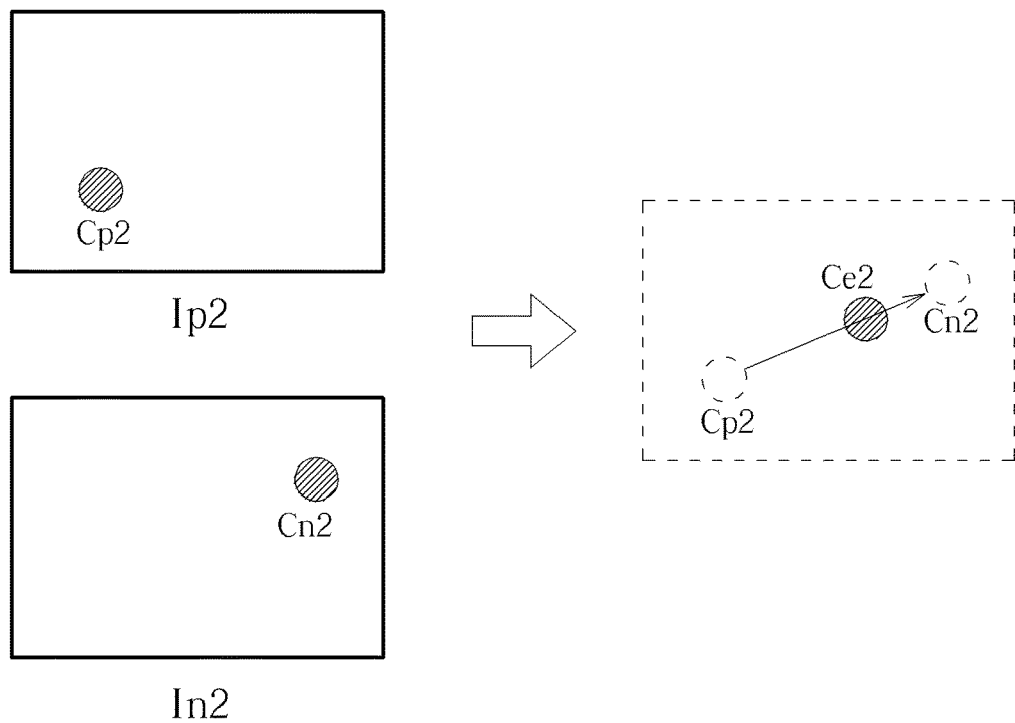
Figure 7:
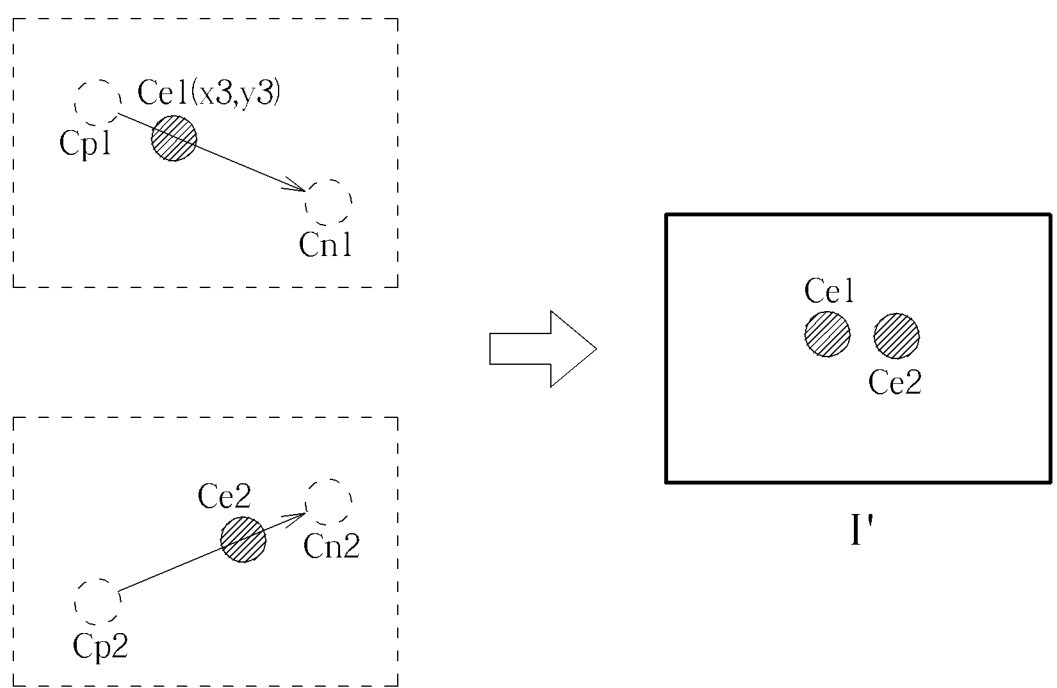
FIG. 7 is a diagram of the stitching frame according to the embodiment of the present invention.

Please refer to FIG. 3 to FIG. 7. FIG. 5 and FIG. 6 are diagrams of transforming the previous coordinate value and the next coordinate value into the estimation coordinate value according to the embodiment of the present invention. FIG. 7 is a diagram of the stitching frame according to the embodiment of the present invention. The object location estimating method of the present invention can compute the first estimation coordinate value Ce1(x3, y3) between the first previous coordinate value Cp1(x1, y1) and the first next coordinate value Cn1(x2, y2) by linear interpolation. The first previous frame Ip1 is captured at the point of time Tp1, and the first next frame In1 is captured at the point of time Tn1. Each coordinate axis (x, y) of the first estimation coordinate value Ce1 can be computed by the formula x3=x1+(x2−x1)*(T1−Tp1)/(Tn1−Tp1) and the formula y3=y1+(y2−y1)*(T1−Tp1)/(Tn1−Tp1). Computation of the second estimation coordinate value Ce2 transformed by the second previous coordinate value Cp2 and the second next coordinate value Cn2 can be the same as computation of the first estimation coordinate value Ce1, and a detailed description is omitted herein for simplicity. In addition, the estimation coordinate value can be computed by the linear interpolation or any other mathematical functions.

The object location estimating method further can set one or more predetermined points of time later than the first predetermined point of time T1, and acquire estimation coordinate values of the object O and the object O' at the predetermined point of time. As an example of a second predetermined point of time T2, and the second predetermined point of time T2 can be determined by the frequency of the timestamp alignment function illustrated in step S200; a third previous frame Ip3 forwardly closest to the second predetermined point of time T2 and a third next frame In3 backwardly closest to the second predetermined point of time T2 can be defined from the first frames Is1. A position of the object O inside the third previous frame Ip3 can be a third previous coordinate value (not shown in the figures), and a position of the object O inside the third next frame In3 can be a third next coordinate value (not shown in the figures). The third previous coordinate value and the third next coordinate value can be transformed into a third estimation coordinate value (not shown in the figures) by the linear interpolation or any other mathematical functions. A previous coordinate value and a next coordinate value of the object O' within a fourth previous frame Ip4 and a fourth next frame In4 closest to the second predetermined point of time T2 from the second frames Is2 can be transformed into another estimation coordinate value. The third previous frame Ip3 and the fourth next frame In4 can be stitched to generate a stitching frame I", and the third estimation coordinate value of the object O and another estimation coordinate value of the object O' can be displayed on the stitching frame I".

If one or more unused frames Iu exist between the first next frame In1 and the third previous frame Ip3, the object location estimating method of the present invention can directly abandon information of the object O within the unused frame Iu, which means a coordinate value of the object O within the unused frame Iu is not applied to compute the third estimation coordinate value. The unused frame Iu can be any frame captured between the predetermined points of time T1 and T2 and not applied to object location estimation. Besides, the unused frame Iu, the third previous frame Ip3 and the third next frame In3 may be used to compute the estimation coordinate value of the object O at the second predetermined point of time T2 by a specific computation formula; for example, the unused frame Iu can be weighted by a low scale, and the third previous frame Ip3 and the third next frame In3 can be weighted by a large scale, so that the unused frame Iu, the third previous frame Ip3 and the third next frame In3 can be applied to compute the estimation coordinate value. Further, the object location estimating method may compare the unused frame Iu with the third previous frame Ip3, and the third next frame In3 and one of the unused frame Iu and the third previous frame Ip3 are used to compute the object location estimation.

In an embodiment of the present invention, the object location estimating device 10 can be the server electrically connected to the plurality of cameras, and the server can set the frequency of the timestamp alignment function for stably computing the estimation coordinate value at each predetermined point of time. In another possible embodiment of the present invention, the object location estimating device 10 can be the computable camera capable of receiving frames generated by other cameras, and the computable camera may capture the frame and estimate the object location alternately; for example, the estimation coordinate value at the next predetermined point of time can be computed after computation of the estimation coordinate value at the previous predetermined point of time is completed, which means an interval between the predetermined points of time may be variable. The frequency of the timestamp alignment function and setting of the predetermined point of time are not limited to the foresaid embodiment, which may be set according to hardware equipment and operation efficiency of the object location estimating device 10, and a detailed description can be omitted herein for simplicity.

In conclusion, fields of view the plural cameras can be partly overlapped or adjacent to each other, and the plural cameras can be synchronized before execution of the object location estimation. The object location estimating method and the object location estimating device of the present invention can set several predetermined points of time according to the specific frequency, acquire the object's metadata within the previous frame and the next frame around the predetermined point of time from each camera, and compute the metadata of the object at the predetermined point of time by the interpolation or any other mathematical functions, for generating the object's metadata when the timestamps of the plural cameras are the same. Comparing to the prior art, the present invention can calibrate a difference of the object's timestamp between the plural cameras for effectively increasing the tracing accuracy of the object.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object location estimating method with a timestamp alignment function, comprising:
   acquiring a plurality of first frames captured by a first camera;
   setting a first predetermined point of time;
   defining a first previous frame and a first next frame closest to the first predetermined point of time from the plurality of first frames;
   acquiring a first previous coordinate value of an object within the first previous frame and a first next coordinate value of the object within the first next frame; and
   utilizing the first previous coordinate value and the first next coordinate value to compute a first estimation coordinate value of the object at the first predetermined point of time.

2. The object location estimating method of claim 1, wherein the first estimation coordinate value between the first previous coordinate value and the first next coordinate value is computed by interpolation.

3. The object location estimating method of claim 1, further comprising:
   acquiring a plurality of second frames captured by a second camera;
   defining a second previous frame and a second next frame closest to the first predetermined point of time from the plurality of second frames;
   acquiring a second previous coordinate value of another object within the second previous frame and a second next coordinate value of the another object within the second next frame; and
   utilizing the second previous coordinate value and the second next coordinate value to compute a second estimation coordinate value of the another object at the first predetermined point of time;
   wherein the first estimation coordinate value and the second estimation coordinate value are at the same point of time.

4. The object location estimating method of claim 3, further comprising:
   generating a stitching frame according to the first previous frame and the second next frame; and
   showing the first estimation coordinate value of the object and the second estimation coordinate value of the another object on the stitching frame.

5. The object location estimating method of claim 3, wherein the first camera is synchronized with the second camera.

6. The object location estimating method of claim 1, further comprising:
   setting a second predetermined point of time later than the first predetermined point of time;
   defining a third previous frame and a third next frame closest to the second predetermined point of time from the plurality of first frames;

acquiring a third previous coordinate value of the object within the third previous frame and a third next coordinate value of the object within the third next frame; and utilizing the third previous coordinate value and the third next coordinate value to compute a third estimation coordinate value of the object at the second predetermined point of time.

7. The object location estimating method of claim 6, further comprising:

determining whether an unused frame is existed between the first next frame and the third previous frame; and abandoning information of the object within the unused frame.

8. The object location estimating method of claim 6, wherein the second predetermined point of time is set according to an operation period of the first estimation coordinate value.

9. An object location estimating device with a timestamp alignment function, comprising:

a receiver adapted to acquire frames captured by at least one camera; and a processor electrically connected to the receiver and adapted to acquire a plurality of first frames captured by a first camera, to set a first predetermined point of time, to define a first previous frame and a first next frame closest to the first predetermined point of time from the plurality of first frames, to acquire a first previous coordinate value of an object within the first previous frame and a first next coordinate value of the object within the first next frame, and to utilize the first previous coordinate value and the first next coordinate value to compute a first estimation coordinate value of the object at the first predetermined point of time.

10. The object location estimating device of claim 9, wherein the first estimation coordinate value between the first previous coordinate value and the first next coordinate value is computed by interpolation.

11. The object location estimating device of claim 9, wherein the processor is further adapted to acquire a plurality of second frames captured by a second camera, to define a second previous frame and a second next frame closest to the first predetermined point of time from the plurality of second frames, to acquire a second previous coordinate value of another object within the second previous frame and a second next coordinate value of the another object within the second next frame, and to utilize the second previous coordinate value and the second next coordinate value to compute a second estimation coordinate value of the another object at the first predetermined point of time, and the first estimation coordinate value and the second estimation coordinate value are at the same point of time.

12. The object location estimating device of claim 11, wherein the processor is further adapted to generate a stitching frame according to the first previous frame and the second next frame, and to show the first estimation coordinate value of the object and the second estimation coordinate value of the another object on the stitching frame.

13. The object location estimating device of claim 11, wherein the first camera is synchronized with the second camera.

14. The object location estimating device of claim 9, wherein the processor is further adapted to set a second predetermined point of time later than the first predetermined point of time, to define a third previous frame and a third next frame closest to the second predetermined point of time from the plurality of first frames, to acquire a third previous coordinate value of the object within the third previous frame and a third next coordinate value of the object within the third next frame, and to utilize the third previous coordinate value and the third next coordinate value to compute a third estimation coordinate value of the object at the second predetermined point of time.

15. The object location estimating device of claim 14, wherein the processor is further adapted to determine whether an unused frame is existed between the first next frame and the third previous frame, and to abandon information of the object within the unused frame.

16. The object location estimating device of claim 14, wherein the second predetermined point of time is set according to an operation period of the first estimation coordinate value.

\* \* \* \* \*